(12) United States Patent
Conrardy et al.

(10) Patent No.: US 10,113,682 B2
(45) Date of Patent: Oct. 30, 2018

(54) METHOD AND DEVICE FOR THERMALLY INSULATING A PIECE OF EQUIPMENT

(71) Applicant: ARIANEGROUP SAS, Paris (FR)

(72) Inventors: Jean-Marie Conrardy, Courcelles sur Seine (FR); Brice Goncalves, Louviers (FR)

(73) Assignee: ARIANEGROUP SAS, Paris (FR)

( * ) Notice: Subject to any disclaimer, the term of this patent is extended or adjusted under 35 U.S.C. 154(b) by 480 days.

(21) Appl. No.: 14/780,319

(22) PCT Filed: Mar. 26, 2014

(86) PCT No.: PCT/FR2014/050707
§ 371 (c)(1),
(2) Date: Sep. 25, 2015

(87) PCT Pub. No.: WO2014/155004
PCT Pub. Date: Oct. 2, 2014

(65) Prior Publication Data
US 2016/0047510 A1 Feb. 18, 2016

(30) Foreign Application Priority Data
Mar. 26, 2013 (FR) .................................... 13 52704

(51) Int. Cl.
*F17C 1/12* (2006.01)
*F16L 59/065* (2006.01)
(Continued)

(52) U.S. Cl.
CPC .......... *F16L 59/065* (2013.01); *F01D 25/145* (2013.01); *F02K 9/605* (2013.01);
(Continued)

(58) Field of Classification Search
CPC ....... F16L 59/065; F16L 59/12; F01D 25/145; F02K 9/605; F17C 1/12; Y02T 50/675
(Continued)

(56) References Cited

U.S. PATENT DOCUMENTS 4,667,390 A * 5/1987 Acharya ............... F16L 59/065
220/560.03
4,794,748 A 1/1989 Schilf
(Continued)

FOREIGN PATENT DOCUMENTS

| EP | 0 263 928 A1 | 4/1988 |
| EP | 0 658 717 A1 | 6/1995 |

(Continued)

OTHER PUBLICATIONS

Russian Office Action issued in Russian Patent Application No. 2015145770 dated Mar. 16, 2018, (English translation).
(Continued)

*Primary Examiner* — J. Gregory Pickett
*Assistant Examiner* — Niki M Eloshway
(74) *Attorney, Agent, or Firm* — Oblon, McClelland, Maier & Neustadt, L.L.P.

(57) ABSTRACT

A device for thermally insulating a piece of equipment, the device including a block of thermal insulation having at least a first hole; a deformable cover made of a gastight material and surrounding the block of insulation so that the wall of the first hole is covered by the gastight cover while leaving open the ends of first hole, the cover defining, at the second end, a first opening that communicates with the first hole and a second opening that communicates with the space situated between the insulating block and the cover; and the first and second openings of the cover being closed in gastight manner with the inside of the cover under a partial vacuum.

15 Claims, 3 Drawing Sheets

(51) Int. Cl.
*F16L 59/12* (2006.01)
*F01D 25/14* (2006.01)
*F02K 9/60* (2006.01)
*F17C 3/02* (2006.01)

(52) U.S. Cl.
CPC ............... *F16L 59/12* (2013.01); *F17C 1/12* (2013.01); *Y02T 50/675* (2013.01)

(58) Field of Classification Search
USPC .......................... 220/560.15, 592.25, 592.27
See application file for complete search history.

(56) References Cited

U.S. PATENT DOCUMENTS

| | | | |
|---|---|---|---|
| 2009/0324871 A1* | 12/2009 | Henn | E04B 1/803 428/69 |
| 2015/0285439 A1* | 10/2015 | Herry | F17C 3/027 114/74 A |
| 2017/0130674 A1* | 5/2017 | Fuller | F02K 9/605 |
| 2017/0159888 A1* | 6/2017 | Han | F17C 13/08 |

FOREIGN PATENT DOCUMENTS

| | | |
|---|---|---|
| EP | 2 390 549 A2 | 11/2011 |
| RU | 2 260 739 C2 | 9/2005 |
| RU | 53 752 U1 | 5/2006 |

OTHER PUBLICATIONS

International Search Report dated Jun. 12, 2014 in PCT/FR14/050707 Filed Mar. 26, 2014.

* cited by examiner

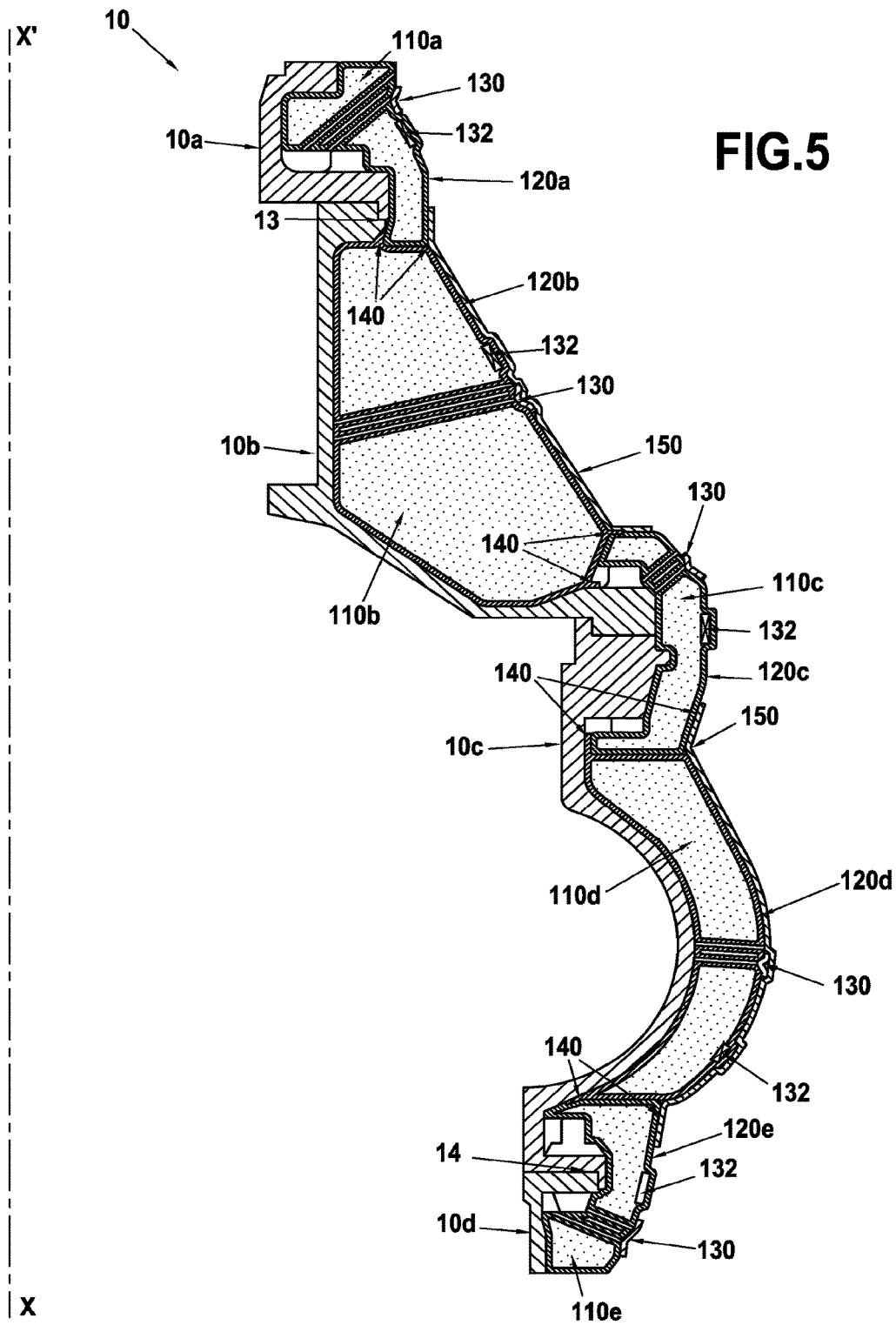

METHOD AND DEVICE FOR THERMALLY INSULATING A PIECE OF EQUIPMENT

BACKGROUND OF THE INVENTION

Field of the Invention

The invention relates to a method and to a device for thermally insulating a piece of equipment, in particular cryogenic equipment.

The field of application of the invention relates particularly, but not exclusively, to engines for aircraft, space vehicles, or rockets.

Description of the Related Art

Thus, in the context of developing space engines with cryogenic liquid propellants such as liquid hydrogen, referred to as LH2, and liquid oxygen, referred to as LOX, the Applicant company has sought to improve the performance of its launchers.

Such launchers are provided with various pieces of equipment that are said to be "cryogenic", i.e. that operate at certain times with propellants presenting temperatures that are very low, lower than −150° C.

Such equipment includes both equipment that remains on the ground and equipment on board the cryogenic or other stages of the launcher. For example, such equipment may comprise a device for fueling cryogenic propellants for a launcher, pipework or pipes, turbopumps, valves, heat exchangers, . . . .

Immediately before starting the engine, that equipment must be cooled down by a flow of propellant coming either from the interface between the launcher and the ground, for a lower stage, or from a tank, for a higher stage. The performance of the launcher depends on its consumption of the propellants during this period of cooling. The target is thus to consume as little propellant as possible by using an insulation system of high performance.

A significant problem consists in managing to provide thermal insulation for pieces of equipment that are complex in shape in space vehicle engines, while avoiding cryopumping, i.e. the formation of condensates and/or frost on the cold walls of the equipment. This phenomenon occurs when the insulation is not gastight and allows ambient air to pass through. Under such circumstances, the water vapor contained in the air becomes frost on contacting the walls, and for equipment containing liquid hydrogen, air becomes liquid or solid depending on the temperature of the wall.

That situation delivers a large amount of heat to the equipment and thus leads to additional consumption of propellants in order to cool the equipment down and to keep it cold. Furthermore, the presence of condensates and/or frost on the walls of such equipment can affect the operation of the engine by providing an environment that is not suitable for the instrumentation situated on the wall of the equipment, or for other members of the engine, as a result of a possible drop in temperature.

In a first technique that is in use, blocks of polyurethane foam are molded around the outer wall of the equipment. The flanges are covered by shells of foam that are caused to overlap. The outside surface of the insulation device is protected and sealed by means of adhesive aluminum strips.

Use is also sometimes made of insulation made of polyimide foam covered in adhesive tape, but that nevertheless does not prevent the formation of cryopumping.

It is also known to fit blocks of foam on the wall without adhesive, those blocks being held by a cover having a double-wall that is swept by helium in order to avoid cryopumping.

Insulation is also known that is based on polyurethane foam covered by a deposit of nickel placed in gastight covers and enclosures under a partial vacuum. For example, Document EP 2 390 549 describes the use of a plurality of insulating elements arranged in a flexible and gastight diaphragm in which a partial vacuum is formed.

Those last two solutions are nevertheless not very effective and they are expensive as well as significantly increasing the weight of the launcher.

Furthermore, it can be understood that those solutions do not make it easy to replace the insulation device during the lifetime of the equipment when it is necessary to take action on the equipment, so the insulation device, which is placed on the outside of the equipment, is opened.

BRIEF SUMMARY OF THE INVENTION

An object of the present invention is to provide a method and a device for thermally insulating a piece of equipment, while enabling the drawbacks of the prior art to be overcome, and in particular while making it possible to provide the equipment with thermal insulation in gastight manner.

It is also desired to provide a method and a device for thermally insulating a piece of equipment while making it possible to replace a portion of the insulation in the event of maintenance work on a portion of the equipment and/or for replacing a faulty portion of the equipment device.

To this end, according to the present invention, the method comprises the following steps:

a) supplying at least one block of thermal insulation presenting a shape complementary to the outside face of a portion of said equipment;

b) making at least a first hole in said block of insulation presenting a first end opening out facing the outside face of said equipment and a second end opening out away from the outside face of said equipment;

c) placing said block of thermal insulation in a deformable cover made of a gastight material such that the wall of said first hole is covered by said gastight cover while leaving the first end and the second end of said hole open and in that the cover defines, at the second end, a first opening that communicates with the first hole and a second opening that communicates with the space situated between the insulating block and the cover;

d) fastening the block of insulation covered in the cover against the outside face of said portion of equipment by gastight and deformable connection means so that the space defined between the block of insulation and said portion of equipment presents a closed outline;

e) connecting the first opening and the second opening to suction means;

f) activating said suction means whereby the inside of the cover is partially evacuated and the cover is pressed firstly against the block of insulation and secondly against said portion of equipment; and g) closing the first opening and the second opening of the cover in gastight manner.

Furthermore, in the present invention, the insulation device comprises a block of thermal insulation presenting a shape complementary to the shape of the outside face of a portion of said equipment to be insulated; said block of insulation including at least a first hole presenting a first end suitable for opening out facing the outside face of said equipment and a second end suitable for opening out away from the outside face of said equipment;

a deformable cover made of a gastight material, said cover surrounding the block of insulation so that the wall of said first hole is covered by said gastight cover while leaving open the first and second ends of said first hole, the cover defining, at the second end, a first opening communicating with the first hole, and a second opening communicating with the space situated between the insulating block and the cover, and the first opening and the second opening of the cover being closed in gastight manner while the inside of the cover is under a partial vacuum.

In this way, it can be understood that by having recourse to such flexible and gastight connection means, the space created between the block of insulation and said portion of equipment is closed and provides an additional insulating layer.

Such gastightness is obtained by applying suction, i.e. a partial vacuum (pressure lower than atmospheric pressure or more generally lower than the outside pressure) in the space between the cover and the block of thermal insulation that it contains, both where it faces the equipment to be insulated (inside wall of the cover) and on the face of the block of thermal insulation facing away from the equipment (outside wall of the cover).

This serves to create an impermeable barrier both between the outside face of the equipment and the face of the cover facing towards the equipment (inside wall of the cover), and also between the thermally insulating block and the face of the thermally insulating block facing away from the equipment (outside wall of the cover).

By establishing suction inside the cover and the space situated between the cover and the wall of the equipment, the cover is pressed firstly against the block of foam and secondly against the equipment, with the cover fitting closely against those surfaces by being pressed closely against them.

This solution also presents the additional advantage of further making it possible to enable each portion of the insulation device or the entire insulation device insulating a portion of said equipment to be replaced.

The thermal insulation device and method of the invention are capable of providing a piece of equipment that is complex in shape with insulation and gastight sealing, while enabling a portion of insulation to be replaced because of the use of adhesion and vacuum pumping.

This modularity of the insulation device makes it possible to insulate pieces of equipment that present moving parts, in particular parts that are rotatably mounted, parts that vibrate, and/or parts carrying instruments, i.e. presenting instruments such as measurement devices, sensors, etc.

The proposed solution takes this environment into account in terms of insulation and of replacement for maintenance.

Furthermore, the use of the cover makes it possible to provide protection against damage and generating particles as can occur when using numerous kinds of insulating material.

Overall, by means of the solution of the present invention, it is possible to isolate a piece of cryogenic equipment that is complex in shape, while providing gastight sealing between its outer walls and the surrounding environment.

The present invention also relates to an assembly suitable for use in isolating a piece of equipment, the assembly comprising a device such as that described above and deformable connection means suitable for fastening the block of insulation covered in the cover against the outside face of said portion of equipment, while defining, between the block of insulation and said portion of equipment, a space having a closed outline.

Preferably, said connection means comprise adhesive elements such as tongues or strips that are adhesive on both faces. Alternatively, said connection means comprise adhesive elements such as a pad or a tongue forming part of said cover 120 or indeed they are constituted by an elastomer gasket adhesively bonded to said cover 120.

The present invention also provides an insulated system comprising a piece of equipment, such as a piece of cryogenic equipment, and an assembly such as that described above and covering the outside face of said equipment, at least in part.

BRIEF DESCRIPTION OF THE SEVERAL VIEWS OF THE DRAWINGS

Other advantages and characteristics of the invention appear on reading the following description made by way of example and with reference to the accompanying drawings, in which:

FIG. 5 shows a variant embodiment of the invention.

DETAILED DESCRIPTION OF THE INVENTION

Figure 1:
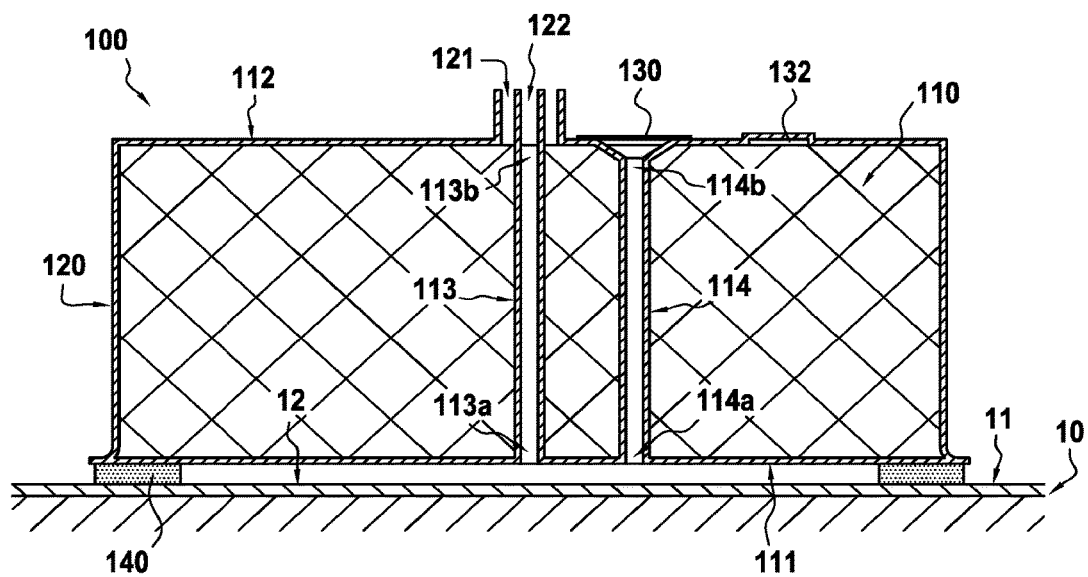
FIG. 1 is a diagrammatic view of the insulation device in a first configuration and prior to performing the method in full.

As can be seen in FIG. 1, a piece of equipment 10 is covered over a portion 12 of its outside face 11 by an insulation device 100.

The insulation device 100 comprises firstly a unitary block 110 of insulating material that presents a thickness, which is preferably substantially constant, a face 111 facing the outside face 11 of said equipment 10, and of a shape that is complementary thereto, and a face 112 facing away from the outside face 11 of said equipment 10.

Said insulating block 110 is preferably made of a porous material such as:
- open-cell polyurethane foam;
- open-cell polystyrene foam;
- compacted powders (silica, perlite, . . . );
- aerogels; and
- compacted fibers.

The material must be capable of withstanding the compression force when it is placed in an evacuated gastight cover.

It is possible to make insulating blocks 110 for simple shapes, and also for complex shapes by using methods based on molding, machining, water jets, lasers, . . . .

The insulating block 110 has a first hole 113 having a first end 113a opening out facing the outside face of said equipment and a second end 113b opening out away from the outside face of said equipment, and preferably, as shown in FIGS. 1 to 4, in the face 112 facing away from the outside face 11 of said equipment 10.

Furthermore, in preferred but non-essential manner, the insulating block 110 presents a second hole 114 presenting a first end 114a opening out facing the outside face of said equipment and a second end 114b opening out away from the outside face of said equipment, and preferably, as shown in FIGS. 1 to 4, in the face 112 facing away from the outside face 11 of said equipment 10.

The insulation device 100 also has a gastight cover 120 constituted by a flexible diaphragm covering all of the faces of the insulating block 110, and including in particular the face 111 that faces the outside face 11 of said equipment 10 and the face 112 facing away from the outside face 11 of said equipment 10.

Initially, the cover 120 also covers all of the wall of the first hole 113 in a manner that is continuous with the covering of the face 111 facing the outside face 11 of said equipment 10, and opening out at the second end 113b of the first hole 113 via a first opening 121. The cover 120 does not close the first end 113a of the first hole 113, which remains open.

Likewise, the cover 120 has a second opening 122 that communicates with the space situated between the insulating block 110 and the cover 120, this second opening 122 opening out away from the outside face of said equipment 10.

Figure 2:
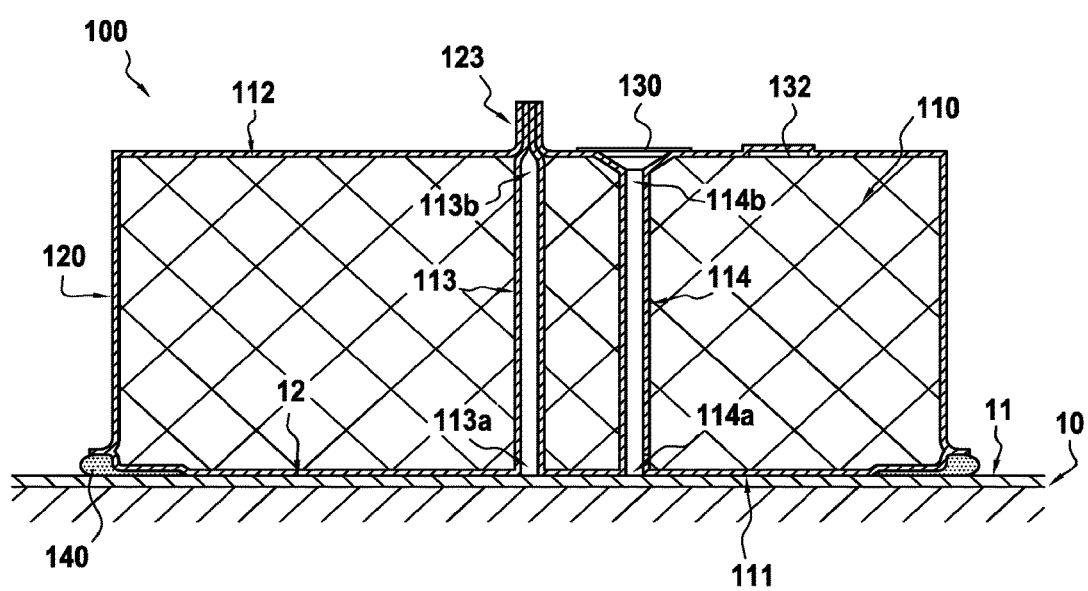
FIG. 2 corresponds to FIG. 1, after the method of the invention has been performed.
Figure 3:
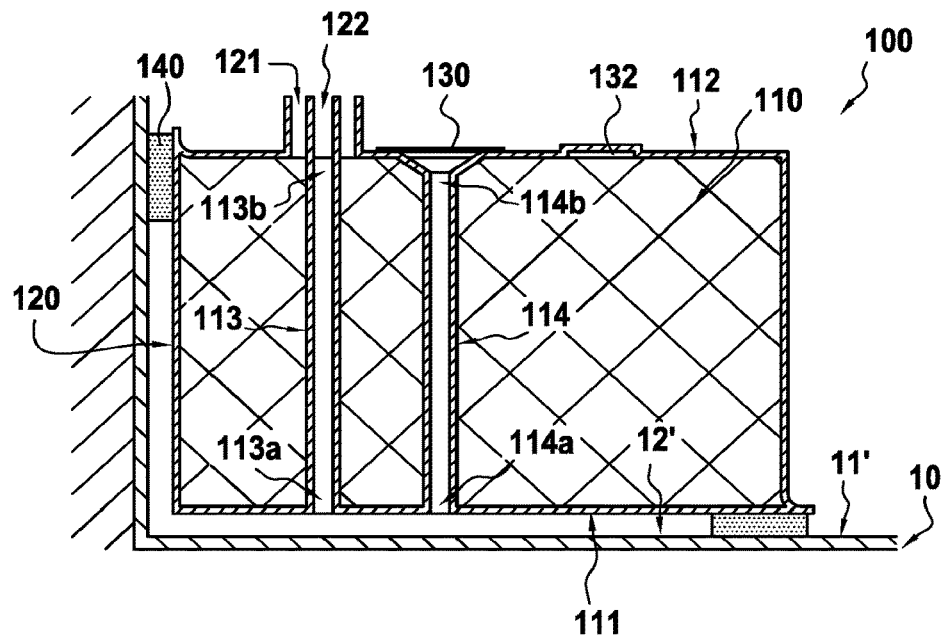
FIG. 3 is a diagrammatic view of the insulation device in a second configuration, and prior to the method being performed in full.

In FIGS. 1 to 3, this second opening 122 of the cover is concentric with the first opening 121 and surrounds the first opening 121.

Furthermore, and in preferred but non-essential manner, the cover 120 has other openings, as can be seen in FIGS. 1 and 3.

Specifically, and preferably:
said block of insulation 110 has a second hole 114 presenting a first end 114a opening out facing the outside face of said equipment 10 and a second end 114b opening out away from the outside face of said equipment 10;
said gastight cover 120 covers the wall of the second hole 114, leaving open the first end 114a and the second end 114b of the second hole 114;
the device 100 also has a first pressure indicator (130) 130 placed so as to close, preferably in gastight manner, the second end 114b of the second hole 114;
Preferably, said cover 120 is made of an elastomer material such as:
polytetrafluoroethylene (PTFE or Teflon);
polyethylene;
polypropylene.
Optionally, the cover 120 may be made more gastight by a metal deposit of aluminum.

Finally, in order to connect the device 100 to the equipment 10, use is made of a connection element 140 placed between the portion 12 of the outside face 11 of the equipment 10 in such a manner as to close completely and in gastight manner the space between the portion 12 and the cover 120 covering the insulating block 110.

For example, it may be a pad or a tongue forming part of the cover 120, being made of the same material as the cover 120, or it may be an elastomer gasket stuck to the cover 120 by an epoxy resin that is suitable for low temperatures. In order to improve sealing at the contact, it is possible to use a vacuum grease.

The cover 120 serves to provide the equipment with sealing and with thermal insulation, and it prevents the insulating material being source of particles.

Figure 4:
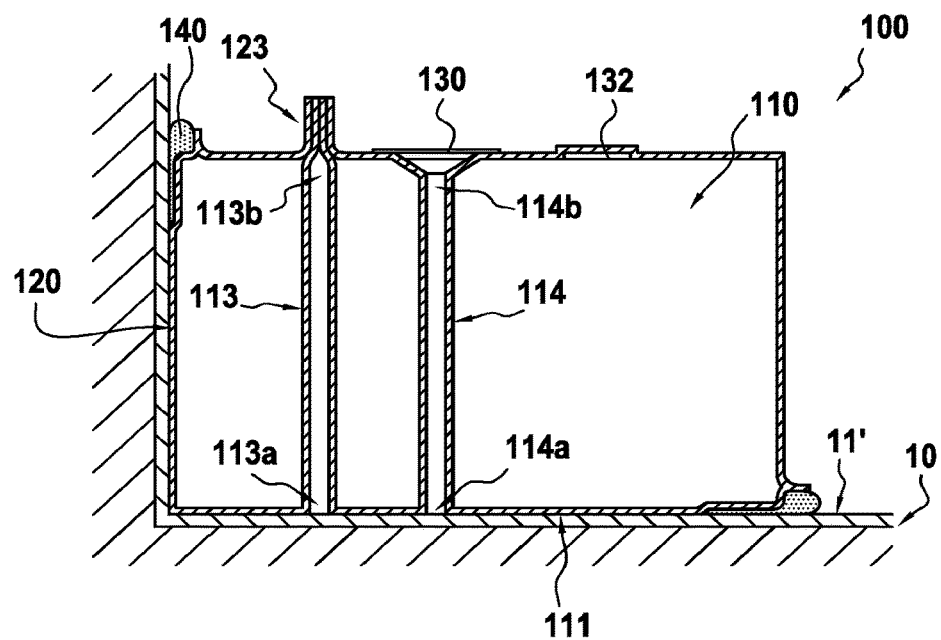
FIG. 4 corresponds to FIG. 3, after the method of the invention has been performed.

As can be seen in FIGS. 2 and 4, after all of the elements constituting the insulation device 110 have been put into place, the following insulation step comprises pumping down in the first opening 121 and in the second opening 122, and then closing the first opening 121 and the second opening 122 of the cover 120 in gastight manner, e.g. by crimping, so as to maintain a pressure lower than atmospheric pressure: this forms an attachment 123 between the first opening 121 and the second opening 122 that closes the second end 113b of the first hole 113.

It should be observed that in a variant embodiment that is not shown, the first opening 121 and the second opening 122 are not placed one around the other (the second opening 122 does not surround the first opening 121 and is located at another location that does not face the portion 12), and they are closed independently, so as to form two separate attachments obtained by two separate gripping operations.

Thus, by means of the first visual pressure indicator 130 and via the second hole 114, it is possible to evaluate whether there is reduced pressure present in the space situated between the cover 120 and the equipment 10, as can be seen in FIGS. 2 and 4.

It is thus possible to ensure that the zone situated between the cover 120 and the equipment 10 is gastight, with this being done by means of the first pressure indicator 130 closing the second end 114b of the second hole 114 in the insulating block 110. The first pressure indicator 130 is subjected to the difference of pressure between this zone and the ambient surroundings.

The outline of this first pressure indicator 130 is located at the surface of the cover at the location of the second end 114b of the second hole 114.

As can be seen in FIGS. 1 to 4, the insulation device 100 preferably also includes a second pressure indicator 132 placed between said cover 120 and said block of insulation 110, in order to ensure that a vacuum is maintained within the cover 120. In FIGS. 1 to 4, this second pressure indicator 132 is positioned on the face 112 facing away from the outside face 11 of said equipment 10, however it could be positioned somewhere else on the surface of the block of insulation 110.

The first pressure indicator 130 and/or the second pressure indicator 132 is/are preferably (a) visual pressure indicator(s) making use of the properties of materials under compression: photoelasticity, rubber, flexible wafer.

Under such circumstances, it is preferable for said cover 120 to be made of a material that is transparent or translucent, thus making it possible to read a change of appearance of the first pressure indicator 130 and/or of the second pressure indicator 132 through the cover.

Thus, when it is in compression, the first pressure indicator 130 and/or the second pressure indicator 132 changes in appearance.

Because of the first pressure indicator 130 positioned within the cover 120 of the insulating block 110, it is possible to know whether a partial vacuum does indeed exist inside the cover 120, and if there are a plurality of insulating blocks 110, it is possible to know whether there is indeed a partial vacuum in each cover 120.

The second configuration shown in FIGS. 3 and 4 differs from the first configuration shown in FIGS. 1 and 2 in that the insulating block 110 of the first configuration (FIGS. 1 and 2) is placed on a portion 12 constituted by a face 11 that is plane or annular with a constant radius, whereas the insulating block 110 of the second configuration (FIGS. 3 and 4) is placed on a portion 12' formed by a face 11' having a reentrant corner or that is annular with a radius that varies so as to form a reentrant shoulder.

Under such circumstances, the connection element 140 follows the outline of the portion 12'.

It should be observed in FIGS. 1 to 4 that the insulation device 100 can cover a portion of the equipment defined by any possible shape and size for a zone of the outside surface of the equipment 10, and also, particularly when the equipment 10 is in the form of a body of revolution, any annular portion of the equipment.

This is shown in FIG. 5, where the equipment 10 is constituted by the casing assembly of a turbopump, that is shown in part in section in FIG. 5, the casing assembly being a body of revolution about the axis X-X' and including, from top to bottom in FIG. 5, a sleeve 10*a*, a front casing 10*b*, a central casing 10*c*, and a turbine casing 10*c*.

There are various zones where the propellant might leak between the sleeve 10*a* and the front casing 10*b* (zone 13) and between the central casing 10*c* and the turbine casing 10*d* (zone 14), where maintaining sealing is particularly critical.

For this purpose, the various blocks of insulation that are used are as follows:
- a first insulating block 110*a* that surrounds the sleeve and the first propellant leakage zone 13 and extending axially to the segment of the front casing 10*b* that is adjacent to the sleeve 10*a* (top axial end portion in FIG. 5);
- a second insulating block 110*b* that is adjacent to the first insulating block 110*a* and that surrounds the front casing 110*b* except for its axial end portions;
- a third insulating block 110*c* that is adjacent to the second insulating block 110*b* and that surrounds the segment of the front casing 10*b* that is adjacent to the central casing 10*c* (bottom axial end portion in FIG. 5) and that surrounds the segment of the central casing 10*c* (top axial end portion in FIG. 5) that is adjacent to the front casing 10*b*;
- a fourth insulating block 110*d* that is adjacent to the third insulating block 110*c* and that surrounds the central casing 10*c* other than its axial end portion; and
- a fifth insulating block 110*e* that is adjacent to the fourth insulating block 110*d* and that surrounds the segment of the central casing 10*c* that is adjacent to the turbine casing 10*d* (bottom axial end portion in FIG. 5) and that surrounds the segment of the turbine casing 10*d* (top axial end portion in FIG. 5) that is adjacent to the central casing 10*c*).

In FIG. 5, in the above-described arrangement, each of these insulating blocks 110*a*, 110*b*, 110*c*, 110*d*, and 110*e* is surrounded by its respective cover 120*a*, 102*b*, 120*c*, 120*d*, and 120*e*.

Connection elements 140 are also arranged so as to close in gastight manner the space between each cover 120*a*, 120*b*, 120*c*, 120*d*, and 120*e* and the facing portion of the wall of the equipment 10.

Finally, under such circumstances, provision is made to use one or more heat-shrink films or bags 150 for holding together a plurality (at least two) adjacent covers from among the covers 120*a*, 120*b*, 120*c*, 120*d*, and 120*e*.

In this way, an insulated system is formed that comprises a piece of equipment 10, such as a cryogenic piece of equipment, and an assembly for insulating said equipment, which assembly covers at least part of the outside face of said equipment 10, and comprises an insulation device 100 and deformable connection means 140 suitable for fastening the block of insulation 110 covered in the cover 120 against that outside face of said portion of the equipment 10.

In order to install this insulating assembly, use is also made of means for generating suction (not shown) that are suitable for being connected to the first opening 121 and to the second opening 122 in each of the covers 120*a*, 120*b*, 120*c*, 120*d*, and 120*e*.

For the method, during step b) of making at least a first hole 113 in said block of insulation 110, a second hole 114 is also made in said block of insulation 110 presenting a first end 114*a* opening out facing the outside face of said equipment 10 and a second end 114*b* opening out away from the outside face of said equipment.

Furthermore, during step c), said gastight cover 120 covers the wall of the second hole 114, while leaving open its first and second ends 114*a* and 114*b*.

Likewise, prior to step e), the first pressure indicator 130 is also supplied and put into place by closing in gastight manner at the location of the second end 114*a* of the second hole 114.

Advantageously, in preferred but non-essential manner, it can be understood that during step c) of putting the cover 120 into place, a second pressure indicator 132 is also supplied that is put into place between said cover 120 and said block of insulation 110.

When use is made of a plurality of assemblies each comprising a block of insulation 110 and a cover, said assemblies being suitable for covering adjacent portions of the outside face of said equipment 10 by performing steps a) to g) of the method described above with reference to a single insulating block, said method of thermally insulating said equipment also includes the following steps:
h) further supplying a heat-shrink outer bag 150;
i) placing said bag 150 in such a manner as to surround in part at least two of said assemblies each constituted by its insulating block 110*a*, 110*b*, 110*c*, 110*d*, and 110*e* covered by its cover 120*a*, 120*b*, 120*c*, 120*d*, and 120*e* and closed in gastight manner; and
j) heating said bag 150 so that it shrinks and clamps onto said assemblies.

The solution of the present invention makes it possible to provide a part (a piece of equipment 10) with thermal insulation and gastight sealing against the ambient environment so as to protect against condensation, frosting, and cryopumping.

The invention claimed is:
1. A method of thermally insulating a piece of equipment, the method comprising:
a) supplying at least one block of thermal insulation presenting a shape complementary to an outside face of a portion of said equipment;
b) making a first hole in said block of insulation presenting a first end opening out facing the outside face of said equipment and a second end opening out away from the outside face of said equipment;
c) placing said block of thermal insulation in a deformable cover made of a gastight material such that a wall of said first hole is covered by said gastight cover while leaving the first end and the second end of said first hole open, and the cover defines, at the second end, a first opening that communicates with the first hole and a second opening that communicates with the space situated between the insulating block and the cover;
d) fastening the block of insulation covered in the cover against the outside face of said portion of equipment by gastight and deformable connection means so that a space defined between the block of insulation and said portion of equipment presents a closed outline;

e) connecting the first opening and the second opening to suction means;
f) activating said suction means whereby an inside of the cover is partially evacuated and the cover is pressed against the block of insulation and against said portion of equipment; and
g) closing the first opening and the second opening of the cover in gastight manner.

2. The method according to claim 1, wherein during step b) a second hole is formed in said block of insulation, presenting a first end opening out facing the outside face of said equipment and a second end opening out away from the outside face of said equipment; and
during step c), said gastight cover covers a wall of the second hole while leaving open the first and second ends of the first hole; and
prior to step e), a first pressure indicator is provided that is put into place by being enclosed in gastight manner at the location of the second end of the second hole.

3. The method according to claim 2, wherein during step c), a second pressure indicator is provided that is placed between said cover and said block of insulation.

4. The method according to claim 1, wherein said connection means comprise a pad or a tongue forming part of said cover or are constituted by an elastomer gasket adhesively bonded to said cover.

5. The method according to claim 1, wherein use is made of a plurality of assemblies, each of the assemblies comprising a block of insulation and a cover, said assemblies being suitable for covering adjacent portions of the outside face of said equipment by performing steps a) to g), and wherein said method further comprises:
h) providing a heat-shrink outer bag;
i) placing said bag in such a manner as to surround in part at least two of said assemblies each formed by a respective block of insulation covered by its cover closed in gastight manner; and
j) heating said bag so that the bag shrinks and clamps against said assemblies.

6. A device for thermally insulating a piece of equipment, the device comprising:
a block of thermal insulation presenting a shape complementary to a shape of an outside face of a portion of said equipment to be insulated, said block of insulation including a first hole presenting a first end suitable for opening out facing the outside face of said equipment and a second end suitable for opening out away from the outside face of said equipment; and
a deformable cover made of a gastight material, said cover surrounding the block of insulation so that a wall of said first hole is covered by said gastight cover while leaving open the first and second ends of said first hole, the cover defining, at the second end, a first opening suitable for being closed in gastight manner and communicating with the first hole, and a second opening suitable for being closed in gastight manner and communicating with a space situated between the insulating block and the cover, and the first opening and the second opening of the cover being closed in gastight manner while an inside of the cover is under a partial vacuum.

7. The device according to claim 6, wherein said block of insulation has a second hole presenting a first end opening out facing the outside face of said equipment and a second end opening out away from the outside face of said equipment, wherein said gastight cover covers a wall of the second hole while leaving open the first and second ends of the first hole; and wherein the device further includes a first pressure indicator put into place by closing the second end of the second hole.

8. The device according to claim 7, further comprising a second pressure indicator put into place between said cover and said block of insulation.

9. The device according to claim 6, wherein the second opening surrounds the first opening.

10. The device according to claim 6, wherein said block of insulation is made of a porous material.

11. The device according to claim 6, wherein said cover is made of an elastomer material.

12. The device according to claim 6, wherein said cover is made of a material that is transparent or translucent.

13. An assembly suitable for use in isolating a piece of equipment, the assembly comprising:
a device according to claim 6; and
deformable connection means suitable for fastening the block of insulation covered in the cover against the outside face of said portion of equipment, while defining, between the block of insulation and said portion of equipment, a space having a closed outline.

14. The assembly according to claim 13, wherein said connection means comprise a pad or a tongue forming part of said cover or said connection means are constituted by an elastomer gasket adhesively bonded to said cover.

15. An insulated system comprising:
a piece of equipment; and
an assembly according to claim 13 covering the outside face of said equipment at least in part.

* * * * *